United States Patent [19]

Burch et al.

[11] 4,334,549

[45] Jun. 15, 1982

[54] PNEUMATIC STARTER OVERTEMPERATURE CONTROL

[75] Inventors: Darrel W. Burch; James P. Wojciehowski, both of Phoenix, Ariz.

[73] Assignee: The Garrett Corporation, Los Angeles, Calif.

[21] Appl. No.: 119,620

[22] Filed: Feb. 8, 1980

Related U.S. Application Data

[62] Division of Ser. No. 886,381, Mar. 13, 1978, Pat. No. 4,220,439.

[51] Int. Cl.³ .............................................. F16K 12/40
[52] U.S. Cl. .................................................... 137/72
[58] Field of Search ................. 137/72, 74, 75; 169/41

[56] References Cited

U.S. PATENT DOCUMENTS

| 269,202 | 12/1882 | Grinnell | 137/72 |
|---|---|---|---|
| 423,608 | 3/1890 | Johnson | 137/72 |
| 1,248,143 | 11/1917 | Lovekin | 137/75 |
| 1,712,116 | 5/1929 | Lovekin | 137/75 |
| 1,892,674 | 1/1933 | Lovekin | 137/75 |
| 2,008,961 | 7/1935 | Lessard | 137/72 |
| 2,025,782 | 12/1935 | Seat | 169/41 |
| 2,080,373 | 5/1937 | Marvin | 137/75 |
| 2,301,014 | 11/1942 | Burklin | 137/75 |
| 2,497,286 | 2/1950 | Ashcraft | 169/41 |
| 4,220,439 | 9/1980 | Burch et al. | 415/9 |

FOREIGN PATENT DOCUMENTS 496226  9/1953  Canada ................................. 137/75

*Primary Examiner*—H. Jay Spiegel
*Attorney, Agent, or Firm*—James W. McFarland; Terry L. Miller; Albert J. Miller

[57] ABSTRACT

An aircraft engine starter including a pneumatic motor driven by pressurized gas upon opening of an upstream control valve. A fusible plug valve automatically closes the control valve and shuts down the pneumatic motor whenever temperature of the lubricating oil of the motor exceeds a preselected level.

12 Claims, 6 Drawing Figures

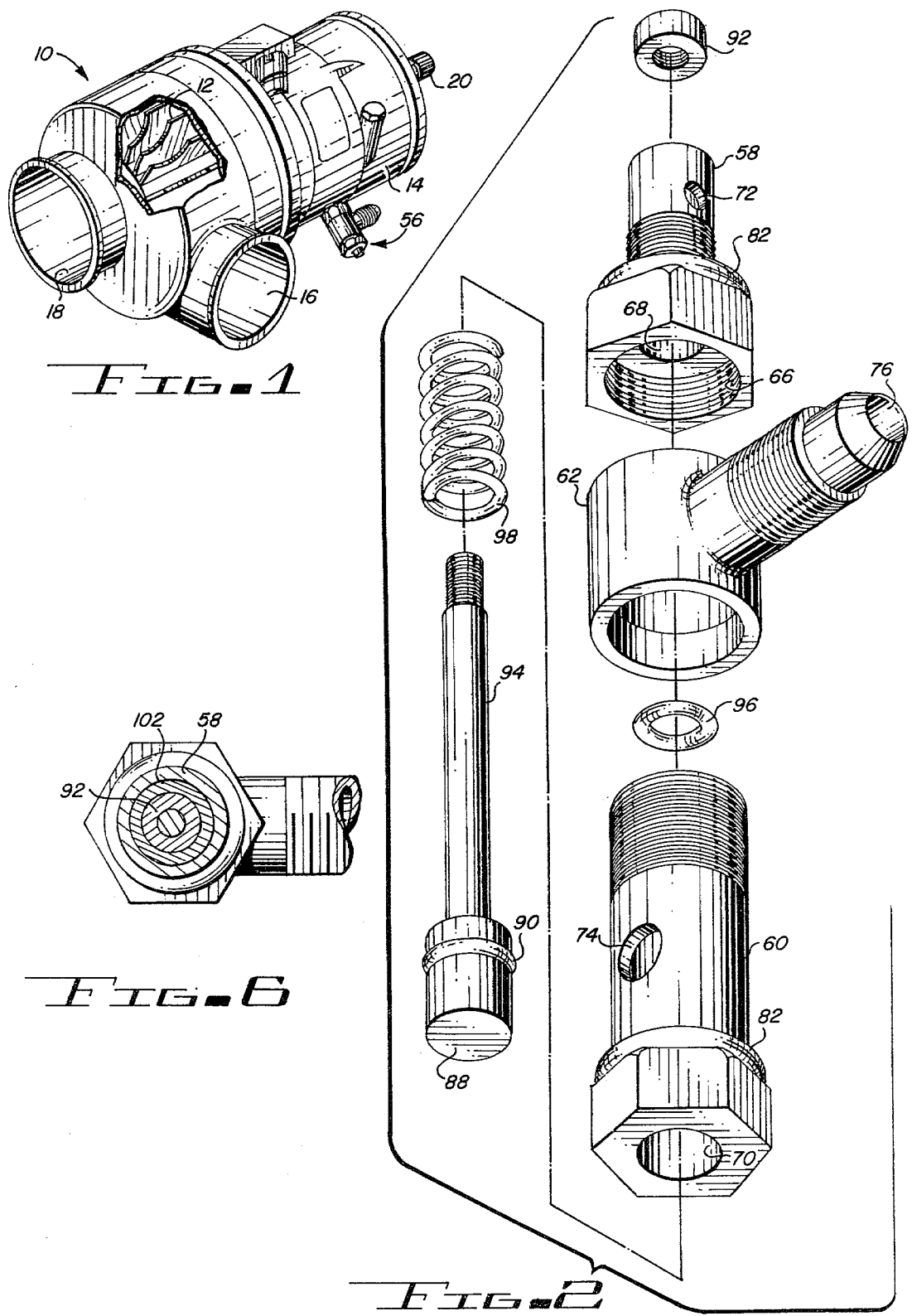

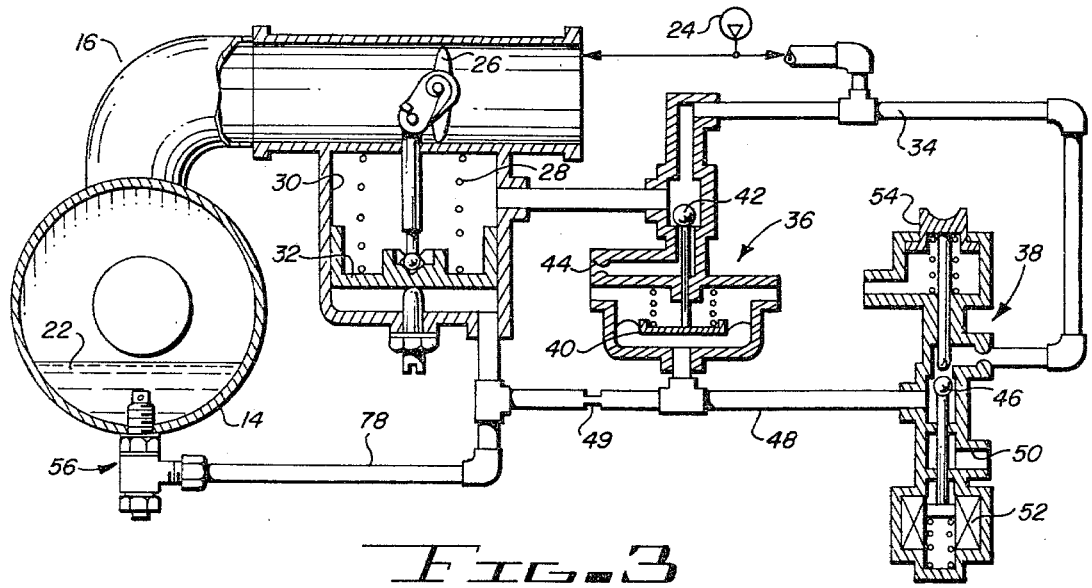
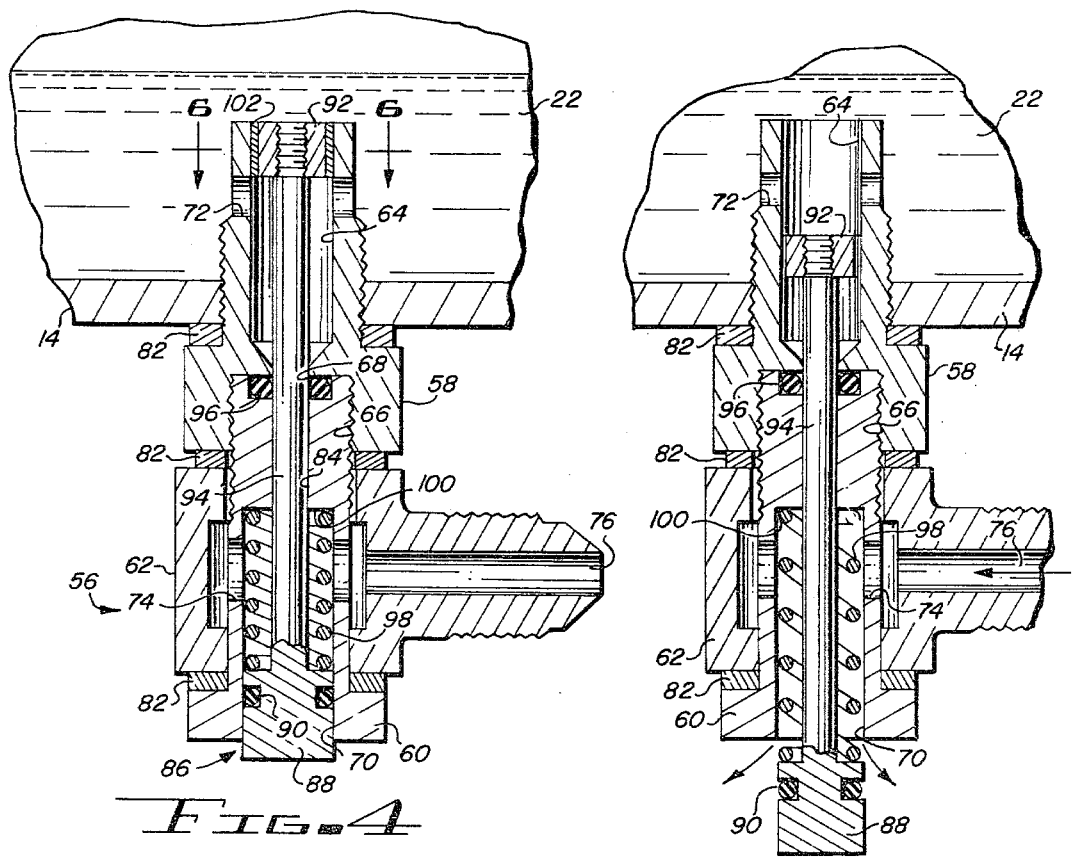

PNEUMATIC STARTER OVERTEMPERATURE CONTROL

This is a division of application Ser. No. 886,381 filed Mar. 13, 1978 now U.S. Pat. No. 4,220,439, granted Sept. 2, 1980.

BACKGROUND OF THE INVENTION

This invention relates to pneumatic control systems and relates more particularly to pneumatic starters for use in starting aircraft engines.

Typically a pneumatic starter of the class referred to includes a fixed level oil sump and normally operates for a short duty cycle while starting the engine of an aircraft. In the instance of system malfunction the starter many times operates undetected after engine starting and is subject to overspeeding and overheating. This typically results in severe internal damage to the starter and often times causes secondary damage to associated components.

A continuing problem for such a system has been in detecting the system malfunction which can ultimately cause starter overspeeding and destruction. Problems of detection of this event are compounded by the relatively short duty cycle of the starter, its small torque drag on a large aircraft engine, and relatively inconsequential effect on engine performance prior to damage to secondary components. Usually the occurrence of such a malfunction is first noted after severe damge to the starter.

Accordingly it will be apparent that there exists a need for a mechanism and method for sensing malfunction in a timely fashion to permit preventive measures to be taken prior to starter destruction. While prior art systems such as illustrated in U.S. Pat. Nos. 1,248,143; 1,600,322; 1,712,116; 1,783,395; 2,707,864; 2,741,085; 3,008,688; 3,338,255; and 3,817,353, have certain similarities with the present invention, none of these prior art systems recognize the discoveries associated with the present invention nor the attendant results in specific structure and method thereof.

SUMMARY OF THE INVENTION

Accordingly it is a broad objective of the present invention to provide an improved control system and method which can detect a malfunction in a pneumatic starter and take preventive action to avoid destruction or severe damage to the starter as a result of this malfunction.

More particularly, it has been discovered that the temperature of lubricating oil of such a pneumatic motor for starting an aircraft engine can be utilized to determine a malfunction of the class described. Further, in accord with this discovery the present invention contemplates an improved system and method wherein the temperature of the lubricating oil of the motor is sensed, and a pneumatic valve is actuated whenever this temperature exceeds a preselected value in order to shutdown motor operation and prevent continued operation thereof to thereby avoid the serious damage to the motor and associated components.

In summary the present invention contemplates a fusible plug valve which has a valve section that normally blocks fluid communication from an actuator to an exhaust port. Development of high pressure in the actuator is operable to open an inlet control valve to permit motive gas flow to the motor to operate the same. The shutoff valve is held in its closed position by a fusible metal joint, such as solder, which is exposed to the lubricating fluid of the motor and melts whenever temperature thereof exceeds a preselected value. In response, the shutoff valve opens communication from the actuator to an exhaust port to relieve pressure in the actuator and cause the inlet control valve to close. This discontinues motor operation and prevents restarting thereof. The shutoff valve is also configured such that a visible indicator is present when the fusible material has melted.

A concomitant object of the present invention is to provide a simple, economical, improved fuse plug valve structure of the class described.

These and other objects and advantages of the present invention are specifically set forth in or will become apparent from the following detailed description of the preferred embodiment of the invention when read in conjunction with the accompanying drawings.

BRIEF DESCRIPTION OF THE DRAWINGS

In the drawings:

FIG. 1 is a perspective view of an aircraft engine starter as contemplated by the present invention with portions broken away to reveal details of construction;

FIG. 2 is an exploded perspective view of the components of the fusible valve structure of the present invention;

FIG. 3 is a partially cross-sectional, partially schematic diagram of a pneumatic control system utilizing the present invention;

FIG. 4 is an elevational cross-sectional view of the fuse plug valve and a portion of the lubricating oil sump;

FIG. 5 is a view similar to FIG. 4 but showing the shutoff valve in its open position; and FIG. 6 is a plan cross-sectional view taken along lines 6—6 of FIG. 4.

DETAILED DESCRIPTION OF THE PREFERRED EMBODIMENT

Referring now more particularly to the drawings, an aircraft engine starter denoted generally by the numeral 10 includes a pneumatic motor in the form of a radial inflow turbine 12 disposed within a casing 14 which has an inlet port 16 and an exhaust port 18. Also within casing 14 is a gear box or accessory component and overrunning clutch connected to drive an output shaft 20. In the general area of the transmission is a fixed level oil sump containing lubricating fluid normally in the form of oil or other liquid 22. Associated with inlet port 16 is a source 24 of motive, pressurized gas delivered to inlet port 16 across a control valve in the form of a butterfly valve 26. Control valve 26 is biased to its closed position illustrated in FIG. 3 by a spring 28 acting through a piston 32 and appropriate connecting linkage. Actuating means in the form of a cylinder 30 and cooperating piston 32 in operative association with control valve 26, are operable to shift the control valve to an open position permitting motive gas flow to inlet port 16 by delivery of a pressurized fluid to the lower end of piston 32 to cause upward movement of the piston.

Associated with the control valve actuator is a pneumatic control system for porting fluid to opposite sides of piston 32. This control system includes a conduit 34 receiving a flow of pressurized fluid or gas from an appropriate source, such as the same source 24, and communicates both with a pneumatic switcher valve 36 and a start valve 38. Switcher valve 36 communicates with the portion of cylinder 30 above piston 32 and is operable to deliver pressurized fluid from conduit 34 to the upper side of piston 32 in the position illustrated. Energization of the piston 40 of switcher valve 36 shifts ball 42 upwardly to close communication of pressure, and allow exhaust of pressurized gas from the upper side of piston 32 through a bleed orifice 44. Start valve 38 includes a ball valve 46 positionable in its upward position shown in FIG. 3 wherein pressurized fluid from the lower end of piston 32 is exhausted through conduit or duct 48 to an exhaust 50. Valve 46 may be shifted downwardly to port pressurized gas into conduit 48, through orifice 49 to the lower side of piston 32 either by energization of solenoid 52 or by depression of a manually operable plunger 54. It will be apparent that upon shifting valve 46 downwardly, the lower side of piston 32 is pressurized and the control valve 26 is rotated to an open position permitting motive gas flow to inlet port 16 to drive motor 12. Similarly, exhaust of pressurized gas from the lower side of piston 32 permits the helical spring 28, and/or pressure on the upper side of piston 32 to drive control valve 26 to its closed position to shut down and interrupt operation of turbine 12.

Associated with the sump portion of casing 14 and the conduit 48 of the control system is a fuse plug valve means in the form of a heat sensitive pneumatic dump valve or fusible plug 56. Plug valve 56 includes a body which may either be unitary or as illustrated comprise three separate but intersecured components: a first elongated inner plug 58, a second elongated outer plug 60, and a fitting 62 disposed intermediate and in surrounding relationship to plug 60. Plug 58 is threadably secured to and extends through casing 14 with an inner end thereof immersed in the lubricating oil 22. The opposite ends of plug 58 have inner and outer counterbores 64, 66 which are interconnected by a smaller diameter central opening 68. The inner end of plug 60 is threadably secured within outer counterbore 66, and plug 60 also has an outer counterbore 70 whose outer end opens to the atmosphere and presents an exhaust duct for relieving pressurized gas. A second central opening 84 in plug 60 is in alignment with the central opening 68 of plug 58. A first set of cross holes 72 at the inner end of plug 58 opens into inner counterbore 64 to assure total immersion thereof in the lubricating liquid 22, while the outer counterbore 70 of plug 60 also has a second set of cross holes 74 that open into counterbore 70. Fitting 62 surrounds the mid portion of plug 60 and the cross holes 74 with an inlet port 76 communicating with outer counterbore 70 through cross holes 74. Inlet port 76 communicates with conduit 48 via an air line 78 downstream of orifice 49. Seals 82 are included to secure the plug 58, 60 and fitting 62 into a unitary, sealed, hollowed valving body.

Disposed within the interior of the valve body is a movable shutoff valve in the form of an elongated stem valve 86. Valve 86 includes a lower valve section in the form of a piston 88 normally disposed in sealing relationship with outer counterbore 70 through an appropriate seal such as an O-ring 90. The opposite inner end 92 of valve 86 is disposed within inner counterbore 64 and immersed in lubricating oil 22. A reduced diameter, elongated stem section 94 extends between and intersecures the piston 88 to the inner end 92 of the valve. Stem 94 extends through the aligned central openings 68, 84 and an appropriate seal 96 cooperates with the plug 60 and stem section 94 to prevent communication between the lubricating liquid 22 and the gas received through inlet port 76. Biasing or spring means in the form of a helical coil compression spring 98 is disposed within outer counterbore 70 and extends between piston 90 and a transverse shoulder 100 formed at the reduced diameter section of plug 60. Spring 98 urges piston 88 outwardly toward the open position illustrated in FIG. 5 wherein the piston 88 clears the exhaust port end of counterbore 70.

Against the bias of spring 98, the piston 88 is maintained in its FIG. 4 closed position by fusible metal material, such as solder, defining an annular joint 102 which secures the inner end 92 of the valve to the inner end of plug 58. The fusible material of joint 102 is so selected to melt whenever the temperature of lubricating oil 22 exceeds its normal operating temperature.

In operation, energization of solenoid 52 or depression of plunger 54 shifts ball valve 46 downwardly to deliver pressurized fluid to the lower side of piston 32 and shift valve 26 toward an open position. Pressurized motive gas is then delivered to the inlet of turbine motor 12 to initiate operation of the starter. It has been found that in the event of a malfunction in the system which would otherwise cause serious damage to the starter motor, the temperature of the lubricating oil 22 rises above its normal operating level. Fusible material 102 is preselected so as to melt at a preselected temperature which is slightly above the normal operating temperature of the lubricating oil, such as within a range of 450° F. to 465° F., to allow the bias of spring 98 and the pressure of fluid from inlet port 76 to shift piston 88 downwardly to its FIG. 5 position completely clearing the exhaust port outer end of counterbore 70. This immediately relieves pressure from conduit 48 and the lower side of piston 32 to permit the control valve 26 to shift to its closed position illustrated in FIG. 3. Pressure is relieved from the lower side of piston 32 even if pressurized fluid is still being directed into conduit 48 from source 24, due to the inclusion of the flow limiting orifice 49. The interruption of motive gas flow to turbine 12 thus shuts down the air turbine starter before damage occurs. It will also be apparent that the motor cannot be restarted with the piston 88 in its FIG. 5 open position.

The fusible plug is configured with the valve 86 arranged relative to the valve body so that the piston 88 shifts to a position exteriorly of the body to be readily visible upon melting of the fusible material. Accordingly, the present invention provides a readily visible indication that a malfunction has occurred while at the same time shutting down motor operation to prevent damage thereto.

The overall configuration of valve 56, especially its three part body and cooperating dump valve 86 presents an extremely compact, economical structure which relieves pressure upon actuation, permits retrofitting to existing motor units in a straightforward manner due to the configuration of its temperature sensing structure while controlling operation of a remotely located valve 26, and yet also provides a visible indicator when actuated.

From the foregoing it will be apparent that the present invention presents a method of providing automatic shutdown capabilities in an aircraft engine pneumatic starter in the event of malfunction, which method includes steps of delivering a flow of pressurized fluid to turbine motor 12 to operate the turbine; delivering a pressurized fluid to operate the piston 32 of the actuator to open the control valve 26 to permit flow to the turbine motor; providing a dump valve 86 which in a normally closed position allows motor operation but which is continuously urged by spring 98 to an open position exhausting pressurized gas from the piston to close the control valve 26; and securing dump valve in its normally closed position by the fusible annular joint 102 which melts in response to overtemperature of the lubricating oil to allow the dump valve to move to its open position.

Various alterations and modifications to the specific structure illustrated and described will be apparent to those skilled in the art. Accordingly, the foregoing detailed description of a preferred embodiment of the invention should be considered exemplary in nature and not as limiting to the scope and spirit of the invention as set forth in the appended claims.

Having described the invention with sufficient clarity that those skilled in the art may make and use it,

We claim:

1. A fusible plug for relieving pressure in a gas duct in response to the heat of a liquid within a housing, comprising:
    an elongate hollowed body threadably secured to said housing with an inner end of said body immersed in said liquid, said body having an outer end disposed exteriorly of said housing in substantially axial alignment with said inner end and having a longitudinally extending outer counter bore presenting an open exhaust port, said body having an inlet port communicating with said duct and opening into the interior of said body at a location exteriorly of said housing and intermediate said inner and outer ends;
    an elongated stem valve positioned within the interior of said body and including a valve section movably received in said outer counter bore, said valve section normally being in a closed position in sealing engagement with said body to prevent flow of gas from said duct and inlet port to said exhaust port, said stem valve including an inner end exposed to said liquid;
    spring means extending between said body and said stem valve for urging said valve section longitudinally in a direction toward said outer end of said body toward an open position permitting exhaust of pressurized gas from said duct through said inlet port to said exhaust port; and
    a fusible metal exposed to said liquid and normally securing said inner end of the stem valve to said body to hold said valve in said closed position when said fusible metal is in a solid state, said fusible metal melting whenever said temperature of the liquid exceeds a preselected value to permit said spring means to shift said valve section to said open position in a direction away from sealing engagement with said body to relieve pressure in said duct.

2. A fusible plug as set forth in claim 1, further including sealing means cooperating with said body and said stem valve for preventing communication of said liquid with said inlet and exhaust ports in all positions of said stem valve.

3. A fusible plug as set forth in claim 2, wherein said stem valve and body are relatively arranged whereby said valve section is movable longitudinally through said exhaust port to be disposed exteriorly of said body to be readily visible only when in said open position.

4. A fusible plug as set forth in claim 3, wherein said stem valve includes an elongated stem section extending between and interconnecting said inner end of the stem valve with said valve section, said stem section being of substantially smaller diameter than said valve section, said sealing means engaging said stem section.

5. A fusible plug as set forth in claim 4, wherein said spring means comprises a helical coil spring surrounding said stem section and extending between said body and said valve section.

6. A fusible plug as set forth in claim 5, including second sealing means carried on said valve section and cooperable with said body to seal said inlet port from said exhaust port with said valve in said closed position, said sealing means passing through said exhaust port to the exterior of said body upon movement of said valve to said open position.

7. A fusible plug as set forth in claim 4, 5 or 6, wherein said inner end of said stem valve is of a larger diameter than said stem section, said fusible metal presenting a joint of annular configuration disposed between and intersecuring said inner end of the valve and said body.

8. A fusible plug as set forth in claim 7 wherein said body defines a longitudinally extending inner counter bore opening on said inner end thereof to communicate with said liquid, said inner end of said stem valve being movably received in said inner counter bore normally adjacent said inner end of said body, said inner end of said stem valve moving inwardly of said inner counter bore upon melting of said fusible metal.

9. The invention of claim 8 wherein said body defines a cross hole communicating said liquid with said inner counter bore, said cross hole opening on said inner counter bore adjacent to said inner end of said stem valve.

10. A heat sensitive pneumatic valve, comprising:
    an elongated first plug having inner and outer counterbores at inner and outer ends and a smaller diameter, first central opening interconnecting said counterbores, said inner end having first cross holes opening into said inner counterbore;
    a second elongated plug having an outer counterbore at an outer end thereof defining an exhaust port, said second plug having an inner end threadably secured within said outer counterbore of the first plug, said second plug having a smaller diameter, second central opening communicating said first central opening with said outer counterbore of the second plug and defining a transverse shoulder, said second plug having second cross holes opening into said outer counterbore thereof;
    a fitting disposed in surrounding relationship to the mid portion of said second plug, said fitting defining a pressurized fluid inlet port communicating with said second cross holes;
    a valve having a larger diameter piston at an outer end thereof normally disposed in sealing engagement with said outer counterbore of the second plug, an inner end, and a smaller diameter elongated stem extending through said first and second central openings and interconnecting said piston and said inner end;
    heat sensitive fusible material between said inner counterbore of the first plug and said inner end of the valve for securing said valve to said first plug with said piston in a first position prohibiting fluid communication between said second cross bores and said exhaust port; and a compression spring disposed in said outer counterbore of said second plug extending between said transverse shoulder and said piston for urging the latter to a second position outwardly of and clearing said exhaust port upon melting of said fusible material to permit flow of pressurized fluid from said inlet port to said exhaust port.

11. A valve as set forth in claim 10, further including a first seal cooperating with said stem to prevent fluid communication between said inner counterbore of the first plug and said outer counterbore of the second plug in both said first and second positions of the valve.

12. A valve as set forth in claim 11, further including a second seal carried by said piston to prevent fluid communication between said second cross bores and said exhaust port in said first valve position, said second seal being carried with said piston outwardly of said exhaust port upon said melting.

* * * * *